United States Patent
Paolini, Jr. et al.

(10) Patent No.: US 7,492,497 B2
(45) Date of Patent: Feb. 17, 2009

(54) MULTI-LAYER LIGHT MODULATOR

(75) Inventors: Richard J. Paolini, Jr., Framingham, MA (US); Shamus Ford Patry, Worcester, MA (US)

(73) Assignee: E Ink Corporation, Cambridge, MA (US)

(*) Notice: Subject to any disclaimer, the term of this patent is extended or adjusted under 35 U.S.C. 154(b) by 0 days.

(21) Appl. No.: 11/832,284

(22) Filed: Aug. 1, 2007

(65) Prior Publication Data

US 2008/0030832 A1 Feb. 7, 2008

Related U.S. Application Data

(60) Provisional application No. 60/821,161, filed on Aug. 2, 2006.

(51) Int. Cl.
- *G02F 1/07* (2006.01)
- *G02B 26/00* (2006.01)
- *G03G 17/04* (2006.01)
- *G01D 15/04* (2006.01)

(52) U.S. Cl. .............. 359/259; 359/296; 399/131; 345/84

(58) Field of Classification Search ............ 359/259, 359/296; 345/84–85, 107; 430/31–38; 347/111–112; 399/131; 204/600

See application file for complete search history.

(56) References Cited

U.S. PATENT DOCUMENTS

| | | |
|---|---|---|
| 2,932,629 A | 4/1960 | Wiley et al. |
| 2,934,530 A | 4/1960 | Ballast et al. |
| 3,668,106 A | 6/1972 | Ota |
| 3,756,693 A | 9/1973 | Ota |
| 3,767,392 A | 10/1973 | Ota |
| 3,792,308 A | 2/1974 | Ota |
| 3,870,517 A | 3/1975 | Ota et al. |
| 3,892,568 A | 7/1975 | Ota |
| 4,418,346 A | 11/1983 | Batchelder |
| 4,435,047 A | 3/1984 | Fergason |
| 4,605,284 A | 8/1986 | Fergason |
| 4,616,903 A | 10/1986 | Fergason |
| 4,643,528 A | 2/1987 | Bell, Jr. |
| 4,707,080 A | 11/1987 | Fergason |
| 4,833,060 A | 5/1989 | Nair et al. |
| 4,835,084 A | 5/1989 | Nair et al. |

(Continued)

FOREIGN PATENT DOCUMENTS

EP  0 443 571 A2  8/1991

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—Ricky L Mack
*Assistant Examiner*—Dawayne A Pinkney
(74) *Attorney, Agent, or Firm*—David J. Cole

(57) ABSTRACT

A light modulator comprises a plurality of discrete variable transmission electro-optic layers arranged so that light will pass successively through the plurality of layers; the light modulator has a higher transmission range than any of the individual electro-optic layers separately.

16 Claims, 2 Drawing Sheets

U.S. PATENT DOCUMENTS

| | | | |
|---|---|---|---|
| 4,919,521 A | 4/1990 | Tada et al. | |
| 4,965,131 A | 10/1990 | Nair et al. | |
| 4,994,312 A | 2/1991 | Maier et al. | |
| 5,055,371 A | 10/1991 | Lee et al. | |
| 5,138,472 A | 8/1992 | Jones et al. | |
| 5,216,530 A | 6/1993 | Pearlman et al. | |
| 5,270,843 A | 12/1993 | Wang | |
| 5,351,143 A | 9/1994 | Sato et al. | |
| 5,354,799 A | 10/1994 | Bennett et al. | |
| 5,411,398 A | 5/1995 | Nakanishi et al. | |
| 5,463,491 A | 10/1995 | Check, III | |
| 5,463,492 A | 10/1995 | Check, III | |
| 5,530,567 A | 6/1996 | Takei | |
| 5,580,692 A | 12/1996 | Lofftus et al. | |
| 5,594,562 A | 1/1997 | Sato et al. | |
| 5,650,872 A | 7/1997 | Saxe et al. | |
| 5,700,608 A | 12/1997 | Eshelman et al. | |
| 5,745,094 A | 4/1998 | Gordon, II et al. | |
| 5,760,761 A | 6/1998 | Sheridon | |
| 5,777,782 A | 7/1998 | Sheridon | |
| 5,798,315 A | 8/1998 | Etoh et al. | |
| 5,808,783 A | 9/1998 | Crowley | |
| 5,872,552 A | 2/1999 | Gordon, II et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,025,896 A | 2/2000 | Hattori et al. | |
| 6,054,071 A | 4/2000 | Mikkelsen, Jr. | |
| 6,055,091 A | 4/2000 | Sheridon et al. | |
| 6,067,185 A | 5/2000 | Albert et al. | |
| 6,097,531 A | 8/2000 | Sheridon | |
| 6,113,810 A | 9/2000 | Hou et al. | |
| 6,118,426 A | 9/2000 | Albert et al. | |
| 6,120,588 A | 9/2000 | Jacobson | |
| 6,120,839 A | 9/2000 | Comiskey et al. | |
| 6,124,851 A | 9/2000 | Jacobson | |
| 6,128,124 A | 10/2000 | Silverman | |
| 6,130,773 A | 10/2000 | Jacobson et al. | |
| 6,130,774 A | 10/2000 | Albert et al. | |
| 6,137,467 A | 10/2000 | Sheridon et al. | |
| 6,144,361 A | 11/2000 | Gordon, II et al. | |
| 6,147,791 A | 11/2000 | Sheridon | |
| 6,156,473 A | 12/2000 | Tyagi et al. | |
| 6,172,798 B1 | 1/2001 | Albert et al. | |
| 6,177,921 B1 | 1/2001 | Comiskey et al. | |
| 6,184,856 B1 | 2/2001 | Gordon, II et al. | |
| 6,215,920 B1 | 4/2001 | Whitehead et al. | |
| 6,225,971 B1 | 5/2001 | Gordon, II et al. | |
| 6,232,950 B1 | 5/2001 | Albert et al. | |
| 6,241,921 B1 | 6/2001 | Jacobson et al. | |
| 6,249,271 B1 | 6/2001 | Albert et al. | |
| 6,252,564 B1 | 6/2001 | Albert et al. | |
| 6,262,706 B1 | 7/2001 | Albert et al. | |
| 6,262,833 B1 | 7/2001 | Loxley et al. | |
| 6,271,823 B1 | 8/2001 | Gordon, II et al. | |
| 6,300,932 B1 | 10/2001 | Albert | |
| 6,301,038 B1 | 10/2001 | Fitzmaurice et al. | |
| 6,312,304 B1 | 11/2001 | Duthaler et al. | |
| 6,312,971 B1 | 11/2001 | Amundson et al. | |
| 6,323,989 B1 | 11/2001 | Jacobson et al. | |
| 6,327,072 B1 | 12/2001 | Comiskey et al. | |
| 6,376,828 B1 | 4/2002 | Comiskey | |
| 6,377,383 B1 | 4/2002 | Whitehead et al. | |
| 6,377,387 B1 | 4/2002 | Duthaler et al. | |
| 6,392,785 B1 | 5/2002 | Albert et al. | |
| 6,392,786 B1 | 5/2002 | Albert | |
| 6,413,790 B1 | 7/2002 | Duthaler et al. | |
| 6,422,687 B1 | 7/2002 | Jacobson | |
| 6,445,374 B2 | 9/2002 | Albert et al. | |
| 6,445,489 B1 | 9/2002 | Jacobson et al. | |
| 6,459,418 B1 | 10/2002 | Comiskey et al. | |
| 6,473,072 B1 | 10/2002 | Comiskey et al. | |
| 6,480,182 B2 | 11/2002 | Turner et al. | |
| 6,498,114 B1 | 12/2002 | Amundson et al. | |
| 6,498,674 B1 | 12/2002 | Sheridon | |
| 6,504,524 B1 | 1/2003 | Gates et al. | |
| 6,506,438 B2 | 1/2003 | Duthaler et al. | |
| 6,512,354 B2 | 1/2003 | Jacobson et al. | |
| 6,515,649 B1 | 2/2003 | Albert et al. | |
| 6,518,949 B2 | 2/2003 | Drzaic | |
| 6,521,489 B2 | 2/2003 | Duthaler et al. | |
| 6,531,997 B1 | 3/2003 | Gates et al. | |
| 6,535,197 B1 | 3/2003 | Comiskey et al. | |
| 6,538,801 B2 | 3/2003 | Jacobson et al. | |
| 6,545,291 B1 | 4/2003 | Amundson et al. | |
| 6,556,262 B1 | 4/2003 | Stephenson et al. | |
| 6,580,545 B2 | 6/2003 | Morrison et al. | |
| 6,639,578 B1 | 10/2003 | Comiskey et al. | |
| 6,652,075 B2 | 11/2003 | Jacobson | |
| 6,657,772 B2 | 12/2003 | Loxley | |
| 6,664,944 B1 | 12/2003 | Albert et al. | |
| D485,294 S | 1/2004 | Albert | |
| 6,672,921 B1 | 1/2004 | Liang et al. | |
| 6,680,725 B1 | 1/2004 | Jacobson | |
| 6,683,333 B2 | 1/2004 | Kazlas et al. | |
| 6,693,620 B1 | 2/2004 | Herb et al. | |
| 6,704,133 B2 | 3/2004 | Gates et al. | |
| 6,710,540 B1 | 3/2004 | Albert et al. | |
| 6,721,083 B2 | 4/2004 | Jacobson et al. | |
| 6,724,519 B1 | 4/2004 | Comiskey et al. | |
| 6,727,873 B2 * | 4/2004 | Gordon et al. ................ 345/88 |
| 6,727,881 B1 | 4/2004 | Albert et al. | |
| 6,738,050 B2 | 5/2004 | Comiskey et al. | |
| 6,750,473 B2 | 6/2004 | Amundson et al. | |
| 6,753,999 B2 | 6/2004 | Zehner et al. | |
| 6,788,449 B2 | 9/2004 | Liang et al. | |
| 6,816,147 B2 | 11/2004 | Albert | |
| 6,819,471 B2 | 11/2004 | Amundson et al. | |
| 6,822,782 B2 | 11/2004 | Honeyman et al. | |
| 6,825,068 B2 | 11/2004 | Denis et al. | |
| 6,825,829 B1 | 11/2004 | Albert et al. | |
| 6,825,970 B2 | 11/2004 | Goenaga et al. | |
| 6,831,769 B2 | 12/2004 | Holman et al. | |
| 6,839,158 B2 | 1/2005 | Albert et al. | |
| 6,842,167 B2 | 1/2005 | Albert et al. | |
| 6,842,279 B2 | 1/2005 | Amundson | |
| 6,842,657 B1 | 1/2005 | Drzaic et al. | |
| 6,864,875 B2 | 3/2005 | Drzaic et al. | |
| 6,865,010 B2 | 3/2005 | Duthaler et al. | |
| 6,866,760 B2 | 3/2005 | Paolini Jr. et al. | |
| 6,870,657 B1 | 3/2005 | Fitzmaurice et al. | |
| 6,870,661 B2 | 3/2005 | Pullen et al. | |
| 6,900,851 B2 | 5/2005 | Morrison et al. | |
| 6,922,276 B2 | 7/2005 | Zhang et al. | |
| 6,950,220 B2 | 9/2005 | Abramson et al. | |
| 6,958,848 B2 | 10/2005 | Cao et al. | |
| 6,967,640 B2 | 11/2005 | Albert et al. | |
| 6,980,196 B1 | 12/2005 | Turner et al. | |
| 6,982,178 B2 | 1/2006 | LeCain et al. | |
| 6,987,603 B2 | 1/2006 | Paolini, Jr. et al. | |
| 6,995,550 B2 | 2/2006 | Jacobson et al. | |
| 7,002,728 B2 | 2/2006 | Pullen et al. | |
| 7,012,600 B2 | 3/2006 | Zehner et al. | |
| 7,012,735 B2 | 3/2006 | Honeyman et al. | |
| 7,023,420 B2 | 4/2006 | Comiskey et al. | |
| 7,030,412 B1 | 4/2006 | Drzaic et al. | |
| 7,030,854 B2 | 4/2006 | Baucom et al. | |
| 7,034,783 B2 | 4/2006 | Gates et al. | |
| 7,038,655 B2 | 5/2006 | Herb et al. | |
| 7,061,663 B2 | 6/2006 | Cao et al. | |
| 7,071,913 B2 | 7/2006 | Albert et al. | |
| 7,075,502 B1 | 7/2006 | Drzaic et al. | |
| 7,075,703 B2 | 7/2006 | O'Neil et al. | |
| 7,079,305 B2 | 7/2006 | Paolini, Jr. et al. | |

| Patent No. | Date | Inventor |
|---|---|---|
| 7,106,296 B1 | 9/2006 | Jacobson |
| 7,109,968 B2 | 9/2006 | Albert et al. |
| 7,110,163 B2 | 9/2006 | Webber et al. |
| 7,110,164 B2 | 9/2006 | Paolini, Jr. et al. |
| 7,116,318 B2 | 10/2006 | Amundson et al. |
| 7,116,466 B2 | 10/2006 | Whitesides et al. |
| 7,119,759 B2 | 10/2006 | Zehner et al. |
| 7,119,772 B2 | 10/2006 | Amundson et al. |
| 7,148,128 B2 | 12/2006 | Jacobson |
| 7,167,155 B1 | 1/2007 | Albert et al. |
| 7,170,670 B2 | 1/2007 | Webber |
| 7,173,752 B2 | 2/2007 | Doshi et al. |
| 7,176,880 B2 | 2/2007 | Amundson et al. |
| 7,180,649 B2 | 2/2007 | Morrison et al. |
| 7,190,008 B2 | 3/2007 | Amundson et al. |
| 7,193,625 B2 | 3/2007 | Danner et al. |
| 7,202,847 B2 | 4/2007 | Gates |
| 7,202,991 B2 | 4/2007 | Zhang et al. |
| 7,206,119 B2 | 4/2007 | Honeyman et al. |
| 7,223,672 B2 | 5/2007 | Kazlas et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,236,291 B2 | 6/2007 | Kaga et al. |
| 7,236,292 B2 | 6/2007 | LeCain et al. |
| 7,242,513 B2 | 7/2007 | Albert et al. |
| 7,247,379 B2 | 7/2007 | Pullen et al. |
| 7,256,766 B2 | 8/2007 | Albert et al. |
| 7,259,744 B2 | 8/2007 | Arango et al. |
| 7,280,094 B2 | 10/2007 | Albert |
| 7,304,634 B2 | 12/2007 | Albert et al. |
| 7,304,787 B2 | 12/2007 | Whitesides et al. |
| 7,312,784 B2 | 12/2007 | Baucom et al. |
| 7,312,794 B2 | 12/2007 | Zehner et al. |
| 7,312,916 B2 | 12/2007 | Pullen et al. |
| 7,321,459 B2 | 1/2008 | Masuda et al. |
| 7,327,511 B2 | 2/2008 | Whitesides et al. |
| 7,349,148 B2 | 3/2008 | Doshi et al. |
| 7,352,353 B2 | 4/2008 | Albert et al. |
| 7,365,394 B2 | 4/2008 | Denis et al. |
| 7,365,733 B2 | 4/2008 | Duthaler et al. |
| 7,375,875 B2 | 5/2008 | Whitesides et al. |
| 7,382,363 B2 | 6/2008 | Albert et al. |
| 7,388,572 B2 | 6/2008 | Duthaler et al. |
| 7,391,555 B2 | 6/2008 | Albert et al. |
| 2002/0060321 A1 | 5/2002 | Kazlas et al. |
| 2002/0090980 A1 | 7/2002 | Wilcox et al. |
| 2002/0113770 A1 | 8/2002 | Jacobson et al. |
| 2003/0011560 A1 | 1/2003 | Albert et al. |
| 2003/0030884 A1 | 2/2003 | Minami |
| 2003/0102858 A1 | 6/2003 | Jacobson et al. |
| 2003/0151702 A1 | 8/2003 | Morrison et al. |
| 2004/0105036 A1 | 6/2004 | Danner et al. |
| 2004/0112750 A1 | 6/2004 | Jacobson et al. |
| 2004/0119681 A1 | 6/2004 | Albert et al. |
| 2004/0155857 A1 | 8/2004 | Duthaler et al. |
| 2004/0169912 A1* | 9/2004 | Liang et al. .................. 359/296 |
| 2004/0180476 A1 | 9/2004 | Kazlas et al. |
| 2004/0190114 A1 | 9/2004 | Jacobson et al. |
| 2004/0226820 A1 | 11/2004 | Webber et al. |
| 2004/0257635 A1 | 12/2004 | Paolini, Jr. et al. |
| 2004/0263947 A1 | 12/2004 | Drzaic et al. |
| 2005/0001810 A1 | 1/2005 | Yakushiji et al. |
| 2005/0007336 A1 | 1/2005 | Albert et al. |
| 2005/0012980 A1 | 1/2005 | Wilcox et al. |
| 2005/0018273 A1 | 1/2005 | Honeyman et al. |
| 2005/0024353 A1 | 2/2005 | Amundson et al. |
| 2005/0062714 A1 | 3/2005 | Zehner et al. |
| 2005/0122284 A1 | 6/2005 | Gates et al. |
| 2005/0122306 A1 | 6/2005 | Wilcox et al. |
| 2005/0122563 A1 | 6/2005 | Honeyman et al. |
| 2005/0151709 A1 | 7/2005 | Jacobson et al. |
| 2005/0152018 A1 | 7/2005 | Abramson et al. |
| 2005/0156340 A1 | 7/2005 | Valianatos et al. |
| 2005/0179642 A1 | 8/2005 | Wilcox et al. |
| 2005/0212747 A1 | 9/2005 | Amundson |
| 2005/0253777 A1 | 11/2005 | Zehner et al. |
| 2005/0259068 A1 | 11/2005 | Nihei et al. |
| 2005/0280626 A1 | 12/2005 | Amundson et al. |
| 2006/0007527 A1 | 1/2006 | Paolini, Jr. et al. |
| 2006/0038772 A1 | 2/2006 | Amundson et al. |
| 2006/0087479 A1 | 4/2006 | Sakurai et al. |
| 2006/0087489 A1 | 4/2006 | Sakurai et al. |
| 2006/0087718 A1 | 4/2006 | Takagi et al. |
| 2006/0139308 A1 | 6/2006 | Jacobson et al. |
| 2006/0139310 A1 | 6/2006 | Zehner et al. |
| 2006/0139311 A1 | 6/2006 | Zehner et al. |
| 2006/0176267 A1 | 8/2006 | Honeyman et al. |
| 2006/0181492 A1 | 8/2006 | Gates et al. |
| 2006/0181504 A1 | 8/2006 | Kawai |
| 2006/0194619 A1 | 8/2006 | Wilcox et al. |
| 2006/0197737 A1 | 9/2006 | Baucom et al. |
| 2006/0197738 A1 | 9/2006 | Kawai |
| 2006/0202949 A1 | 9/2006 | Danner et al. |
| 2006/0209008 A1 | 9/2006 | Nihei et al. |
| 2006/0214906 A1 | 9/2006 | Kobayashi et al. |
| 2006/0223282 A1 | 10/2006 | Amundson et al. |
| 2006/0231401 A1 | 10/2006 | Sakurai et al. |
| 2006/0232531 A1 | 10/2006 | Amundson et al. |
| 2006/0238488 A1 | 10/2006 | Nihei et al. |
| 2006/0262060 A1 | 11/2006 | Amudson |
| 2006/0263927 A1 | 11/2006 | Sakurai et al. |
| 2006/0279527 A1 | 12/2006 | Zehner et al. |
| 2006/0291034 A1 | 12/2006 | Patry et al. |
| 2007/0013683 A1 | 1/2007 | Zhou et al. |
| 2007/0035532 A1 | 2/2007 | Amudson et al. |
| 2007/0035808 A1 | 2/2007 | Amudson et al. |
| 2007/0052757 A1 | 3/2007 | Jacobson |
| 2007/0057908 A1 | 3/2007 | Jacobson |
| 2007/0069247 A1 | 3/2007 | Amundson et al. |
| 2007/0085818 A1 | 4/2007 | Amundson et al. |
| 2007/0091417 A1 | 4/2007 | Cao et al. |
| 2007/0091418 A1 | 4/2007 | Danner et al. |
| 2007/0097489 A1 | 5/2007 | Doshi et al. |
| 2007/0103427 A1 | 5/2007 | Zhou et al. |
| 2007/0109219 A1 | 5/2007 | Whitesides et al. |
| 2007/0128352 A1 | 6/2007 | Honeyman et al. |
| 2007/0146310 A1 | 6/2007 | Paolini, Jr. et al. |
| 2007/0152956 A1 | 7/2007 | Danner et al. |
| 2007/0153361 A1 | 7/2007 | Danner et al. |
| 2007/0200795 A1 | 8/2007 | Whitesides et al. |
| 2007/0200874 A1 | 8/2007 | Amundson et al. |
| 2007/0207560 A1 | 9/2007 | LeCain et al. |
| 2007/0211002 A1 | 9/2007 | Zehner et al. |
| 2007/0211331 A1 | 9/2007 | Danner et al. |
| 2007/0223079 A1 | 9/2007 | Honeyman et al. |
| 2007/0247697 A1 | 10/2007 | Sohn et al. |
| 2007/0285385 A1 | 12/2007 | Albert et al. |
| 2007/0286975 A1 | 12/2007 | Fazel et al. |
| 2008/0013155 A1 | 1/2008 | Honeyman et al. |
| 2008/0013156 A1 | 1/2008 | Whitesides et al. |
| 2008/0023332 A1 | 1/2008 | Webber et al. |
| 2008/0024429 A1 | 1/2008 | Zehner |
| 2008/0024482 A1 | 1/2008 | Gates et al. |
| 2008/0030832 A1 | 2/2008 | Paolini, Jr. et al. |
| 2008/0043318 A1 | 2/2008 | Whitesides et al. |
| 2008/0048969 A1 | 2/2008 | Whitesides et al. |
| 2008/0048970 A1 | 2/2008 | Drzaic et al. |
| 2008/0054879 A1 | 3/2008 | LeCain et al. |
| 2008/0057252 A1 | 3/2008 | Danner et al. |
| 2008/0074730 A1 | 3/2008 | Cao et al. |
| 2008/0117495 A1 | 5/2008 | Arango et al. |

FOREIGN PATENT DOCUMENTS

| | | |
|---|---|---|
| EP | 0 659 866 A2 | 6/1995 |

| | | |
|---|---|---|
| EP | 1 099 207 B1 | 3/2002 |
| EP | 1 145 072 B1 | 5/2003 |
| WO | WO 00/36560 | 6/2000 |
| WO | WO 00/38000 | 6/2000 |
| WO | WO 00/67110 | 11/2000 |
| WO | WO 01/07961 | 2/2001 |
| WO | WO 2004/079442 | 9/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 2.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bampfield, H.A., and Cooper, J., "Emulsion Explosives", "Encyclopedia of Emulsion Technology: vol. 3—Basic Theory Measurement Applications", Becher, P. (ed.), Marcel Dekker, New York (1988).

Bouchard, A. et al., "High-Resolution Microencapsulated Electrophoretic Display on SIlicon", SID 04 Digest, 651 (2004).

Caillot, E. et al. "Active Matrix Electrophoretic Information Display for High Performance Mobile Devices", IDMC Proceedings (2003).

Cameron, N.R., et al., "High Internal Phase Emulsions (HIPEs)—Structure, Properties and Use in Polymer Preparation", Adv. Polym. Sci., 126, 163 (1996).

Chen, Y., et al., "A Conformable Electronic Ink Display using a Foil-Bsed a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Hayes, R.A., et al., "Video-Speed Electronic Paper Based on Electrowetting", Nature, vol. 425, Sep. 25, pp. 383-385 (2003).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Ji, Y., et al., "P-50: Polymer Walls in Higher-Polymer-Content Bistable Reflective Cholesteric Displays", SID 96 Digest, 611 (1996).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Pitt, M.G., et al., "Power Consumption of Microencapsulated Electrophoretic Display for Smart Handheld Applications", SID 02 Digest, 1378 (2002).

Webber, R., "Image Stability in Active-Matrix Microencapsualted Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

MULTI-LAYER LIGHT MODULATOR

REFERENCE TO RELATED APPLICATIONS

This application claims benefit of Provisional Application Ser. No. 60/821,161, filed Aug. 2, 2006.

This application is related to application Ser. No. 10/907,140, filed Mar. 22, 2005 (Publication No. 2005/0213191, now U.S. Pat. No. 7,327,511), which claims benefit of provisional Application Ser. No. 60/555,529, filed Mar. 23, 2004 and provisional Application Ser. No. 60/585,579, filed Jul. 7, 2004.

This application is also related to U.S. Pat. No. 7,116,466, issued Oct. 3, 2006 on application Ser. No. 11/161,179, filed Jul. 26, 2005.

This application is also related to copending application Ser. No. 11/162,188, filed Aug. 31, 2005 (Publication No. 2006/0038772), which claims benefit of provisional Application Ser. No. 60/605,761, filed Aug. 31, 2004. The aforementioned application Ser. No. 11/162,188, is also a continuation-in-part of the aforementioned application Ser. No. 10/907,140. The aforementioned application Ser. No. 11/162,188 is also a continuation-in-part of application Ser. No. 10/687,166, filed Oct. 16, 2003 (Publication No. 2004/0136048, now U.S. Pat. No. 7,259,744), which itself claims benefit of Provisional Application Ser. No. 60/419,019, filed Oct. 16, 2002. Application Ser. No. 10/687,166 is also a continuation-in-part of application Ser. No. 08/983,404, filed Mar. 26, 1999 (now U.S. Pat. No. 7,106,296), which is the U.S. National Phase of International Application No. PCT/US96/12000, filed Jul. 19, 1996, which is itself (so far as the United States is concerned) a continuation-in-part of application Ser. No. 08/504,896, filed Jul. 20, 1995 (now U.S. Pat. No. 6,124,851).

The entire contents of all the aforementioned applications, and of all U.S. patents and published and copending applications mentioned below, are herein incorporated by reference.

BACKGROUND OF INVENTION

This invention relates to multi-layer light modulators, that is to say light modulators having at least two light modulating layers arranged so that light will pass through successively through the two or more light modulating layers. Light modulators include variable transmission windows, mirrors and similar devices designed to modulate the amount of light or other electromagnetic radiation passing therethrough. For convenience, the term "light" will normally be used herein, but this term should be understood in a broad sense to include electromagnetic radiation at non-visible wavelengths. For example, the present invention might be applied to provide windows which can modulate infra-red radiation for controlling temperatures within buildings. This invention is primarily but not exclusively directed to light modulators which use particle-based electrophoretic media to control light modulation.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example the aforementioned white and dark blue states. The term "monochrome" may be used hereinafter to denote a drive scheme which only drives pixels to their two extreme optical states with no intervening gray states.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March, 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, Vol. 425, pages 383-385 (25 Sep. 2003). It is shown in copending application Ser. No. 10/711,802, filed Oct. 6, 2004 (Publication No. 2005/0151709), that such electro-wetting displays can be made bistable.

Another type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,420; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; 7,119,772; 7,148,128; 7,167,155; 7,170,670; 7,173,752; 7,176,880; 7,180,649; 7,190,008; 7,193,625; 7,202,847; 7,202,991; 7,206,119; 7,223,672; 7,230,750; 7,230,751; 7,236,290; 7,236,292; and U.S. Patent Applications Publication Nos. 2002/0060321; 2002/0090980; 2003/0011560; 2003/0102858; 2003/0151702; 2003/0222315; 2004/0094422; 2004/0105036; 2004/0112750; 2004/0119681; 2004/0136048; 2004/0155857; 2004/0180476; 2004/0190114; 2004/0196215; 2004/0226820; 2004/0257635; 2004/0263947; 2005/0000813; 2005/0007336; 2005/0012980; 2005/0017944; 2005/0018273; 2005/0024353; 2005/0062714; 2005/0067656; 2005/0099672; 2005/0122284; 2005/0122306; 2005/0122563; 2005/0134554; 2005/0151709; 2005/0152018; 2005/0156340; 2005/0179642; 2005/0190137; 2005/0212747; 2005/0213191; 2005/0219184; 2005/0253777; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0202949; 2006/0223282; 2006/0232531; 2006/0245038; 2006/0256425; 2006/0262060; 2006/0279527; 2006/0291034; 2007/0035532; 2007/0035808; 2007/0052757; 2007/0057908; 2007/0069247; 2007/0085818; 2007/0091417; 2007/0091418; 2007/0097489; 2007/0109219; 2007/0128352; and 2007/0146310; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (see U.S. Patent Publication No. 2004/0226820); and other similar techniques.) Thus, the resulting display can be flexible. Further, because the display medium can be printed (using a variety of methods), the display itself can be made inexpensively.

Shutter mode displays can be used as conventional reflective displays, for example, by using particles having one color and providing a surface of a different color positioned on the opposed side of the electro-optic medium from the viewing surface through which an observer views the display; see, for example, U.S. Pat. No. 6,177,921. Alternatively, shutter mode displays can be used as light modulators, that is to say devices which in one (open or transparent) optical state allow light to pass therethrough, while in another (closed or opaque) optical state the light is blocked.

Light modulators represent a potentially important market for electro-optic media. As the energy performance of buildings and vehicles becomes increasingly important, electro-optic media can be used as coatings on windows (including skylights and sunroofs) to enable the proportion of incident radiation transmitted through the windows to be electronically controlled by varying the optical state of the electro-optic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications of VT technology include privacy glass and glare-guards in electronic devices.

One of the problems in designing light modulators is securing a sufficiently wide range of transmission states. For example, a VT window designed to control light levels within a building may need to block a very high proportion of the light present when the exterior of the building is exposed to a blazing summer sun, but to transmit a high proportion of the light present on a dull winter day. The ideal electro-optic medium for use in a light modulator would be one variable all the way from 100 per cent transmission to 0 per cent transmission, but in practice no such medium exists and the range of transmissions available from most electro-optic media is limited by physical constraints. For example, in the VT electrophoretic media described in the aforementioned 2005/0213191 and U.S. Pat. No. 7,116,466, in which the closed or "opaque" state has electrophoretic particles dispersed over the entire area of the medium, while the open or "transparent" state has the particles pulled to the sidewalls of capsules or agglomerated in some way, geometric limitations set bounds to the difference in optical transmission between the open and closed optical states of the medium.

It has now been realized that, provided the characteristics of the individual VT layers are carefully chosen, the range of optical transmissions available from a light modulator can be increased by stacking multiple variable transmission layers adjacent each other so that light must pass through all the stacked layers.

SUMMARY OF INVENTION

Accordingly, this invention provides a light modulator comprising a plurality of discrete variable transmission electro-optic layers arranged so that light will pass successively through the plurality of layers, the light modulator having a higher transmission range than any of the individual electro-optic layers separately. For reasons explained in detail below, the individual VT layers used in the light modulator should typically satisfy the relationship:

$$O \geq 0.5R + 0.5$$

where O is the open state transmission (i.e., the maximum optical transmission which the layer is capable of achieving, allowing of course for the method used to drive the light modulator to its "open", most light-transmissive state) of a single layer and R is the transmission range of the layer (i.e., the difference between the transmissions of the extreme open and closed states of the layer. Also for reasons explained below, the individual electro-optic layers desirably have an open state transmission of at least about 75 per cent.

The light modulator of the present invention may further comprise two substantially transparent sheets of material disposed on opposed sides of the plurality of discrete variable transmission electro-optic layers, each of the substantially transparent sheets of material having a thickness of at least about 1 mm, or in many cases considerably more. The substantially transparent sheets may be made of glass (or possibly a transparent polymer such as poly(methyl methacrylate)) having a thickness in the range of (say) 5-10 mm so that the light modulator has the form of a variable transmission window. In some cases, it may be convenient to mount electrodes directly on the transparent sheets.

This invention also provides a light modulator comprising a plurality of discrete variable transmission electro-optic layers arranged so that light will pass successively through the plurality of layers, at least one electrode arranged to apply an electric field to the electro-optic layers, and voltage supply means for controlling the voltage of the at least one electrode, the voltage supply means being arranged to apply a first waveform to the at least one electrode to drive the electro-optic layers to a first optical state in which the layers are substantially non-light-transmissive and to apply a second waveform to the at least one electrode to drive the electro-optic layers to a second optical state in which the layers are substantially more light-transmissive than in the first optical state.

This light modulator of the present invention may make use of any of the types of electro-optic media discussed above. In one form of this light modulator, each of the electro-optic layers comprises an electrophoretic medium comprising a plurality of electrically charged particles disposed in a fluid and capable of moving through the fluid on application of an electric field to the medium. The electrophoretic medium may comprise a plurality of dark (a term which is used herein to include black) colored charged particles in a liquid; the dark colored particles may comprise carbon black or copper chromite. The charged particles and the fluid may be confined within a plurality of cavities in a solid medium, the cavities having sidewalls extending substantially perpendicular to the thickness of the electro-optic layer. This type of cavity-containing medium may be an encapsulated electrophoretic medium, a polymer-dispersed electrophoretic medium or a microcell electrophoretic medium, as discussed above. When this type of cavity-containing medium is used, the first waveform may comprise a DC voltage, or a low frequency alternating voltage and the second waveform comprises an alternating voltage which causes the charged particles against the sidewalls of the cavities; see the aforementioned 2006/0038772 for further details regarding the driving of such light modulators.

Several different electrode arrangements may be used in the light modulators of the present invention. Typically, the light modulator will have two electrodes disposed on opposed sides of the plurality of variable transmission electro-optic layers. These may be the only electrodes present (i.e., there may not be any electrodes present between adjacent pairs of electro-optic layers), in which case the single pair of electrodes will control the optical state of all the electro-optic layers. Alternatively the light modulator may have at least one electrode between each adjacent pair of electro-optic layers, so that the optical state of each electro-optic layer can be controlled independently. "Intermediate" arrangements are of course possible; for example, a light modulator could have six electro-optic layers grouped into three adjacent pairs, with no electrode between the two layers within each pair, but with an electrode between pairs.

To reduce light losses as the light passes through the multiple layers of the present light modulator, it is desirable that the layers be secured to each other by means of an optically clear adhesive.

As noted above, the individual electro-optic (VT) layers used in the light modulator of the present invention should satisfy the relationship:

$$O \geq 0.5R + 0.5$$

where O is the transmission of the second optical state of a single layer and R is the transmission range of the layer (i.e., the difference between the transmissions of the extreme open and closed states of the layer). The individual electro-optic layers desirably have a transmission in their second optical state of at least about 75 per cent. As demonstrated below, the optimum number of electro-optic layers varies with the transmission of the second optical state and the transmission range; the light modulator may have at least three, and conveniently not more than six, electro-optic layers. The light modulator may be provided with two substantially transparent sheets of material, as previously described.

DETAILED DESCRIPTION

Figure 1:
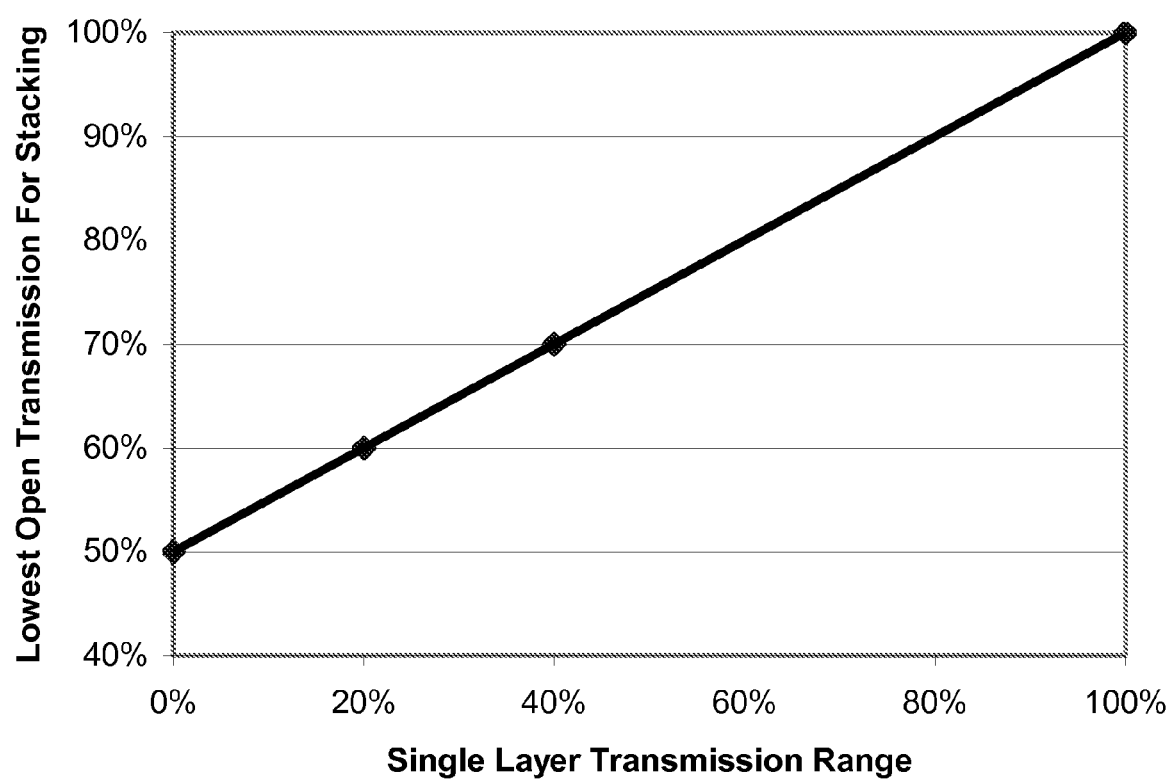
FIG. 1 of the accompanying drawings is a graph showing the ranges of open state single electro-optic layer transmission and single layer transmission range useful in the present invention.

As indicated above, the present invention provides a light modulator comprising a plurality of discrete variable transmission electro-optic layers arranged so that light will pass successively through the plurality of layers. Typically the electro-optic or VT layers of the light modulator will be in the form of thin flat sheets having a width (in the plane of the sheet) much greater (say at least an order of magnitude greater) than the thickness of the sheet (perpendicular to the plane of the sheet). A stack of such thin sheets, preferably held together by optically clear adhesive between the sheets, can be produced in a form resembling a pane of glass, and thus suitable for use in a conventional window frame or similar glass-mounting device. Alternatively, such a stack of thin sheets can be mounted between two transparent, and typically rigid, sheets of glass, polymer or other material to produce a composite sheet which can readily be used in place of a pane of glass in a conventional window frame or similar glass-mounting device, in a building, vehicle or other location where control of light transmission is desired.

The light modulator of the present invention can overcome the limitations of single layers of electro-optic media used as light modulators, for example the limited transmission range between the open and closed states of the shutter mode electrophoretic media described in the aforementioned 2005/0213191 and U.S. Pat. No. 7,116,466. The individual layers of the light modulator should be chosen so as to have as high a transmission range as possible and to have as high an open state transmission as possible; in practice, it may not be possible to optimize both these parameters at the same time and the detailed analysis below indicates how best to compromise between the two objectives. For example, if a given medium has a maximum transmission range of 40 per cent (a range reasonably attainable in practice), for purposes of the present invention a form of this medium with an open state having 90 per cent transmission and a closed state having 50 per cent transmission is greatly preferred over a form having an open state having 60 per cent transmission and a closed state having 20 per cent transmission. (For convenience, these two types of layers may hereinafter be referred to as "90/50" and "60/20" layers respectively.) For such a medium having a maximum transmission range of 40 per cent, the theoretical ideal form would be one having a 100 per cent open state transmission and a 60 per cent closed state transmission; although such an ideal form cannot be attained in practice, every effort should be made to push the open state transmission as close to 100 per cent consistent with keeping the maximum transmission range.

Stacking a plurality of layers of this medium together and bonding them to each other with an optically clear adhesive to reduce inter-layer light losses, provides a light modulator of the present invention having a transmission range higher than that of the individual layers. For example a stack of two 90/50 layers will (ignoring losses between the layers) have an open state of 0.9×0.9 or 81 per cent transmission, and a closed state of 0.5×0.5 or 25 per cent transmission, with a transmission range of 56 per cent compared to the 40 per cent of each layer separately. Similarly, a stack of three 90/50 layers will (again ignoring losses between the layers) have an open state of $0.9^3$ or 72.9 per cent transmission, and a closed state of $0.5^3$ or 12.5 per cent transmission, with a transmission range of 60.4 per cent. However, a similar calculation shows that a stack of four 90/50 layers has a transmission range of only 59.4 per cent, less than that of the three layer stack. Thus, for 90/50 layers, the optimum stack height is three layers.

The Table below shows the transmission range of multi-layer stacks as a function of the open state transmission ("OST" in the Table) of a single layer and the number of stacked layers, again assuming that the individual layers have a transmission range of 40 per cent.

TABLE

| | Number of layers each with transmission range of 40 percent | | | | |
|---|---|---|---|---|---|
| OST, % | 2 | 3 | 4 | 5 | 6 |
| 100 | 64.0 | 78.4 | 87.0 | 92.2 | 95.3 |
| 95 | 60.0 | 69.1 | 72.3 | 72.3 | 70.7 |
| 90 | 56.0 | 60.4 | 59.4 | 55.9 | 51.6 |
| 85 | 52.0 | 52.3 | 48.1 | 42.5 | 36.9 |
| 80 | 46.0 | 44.8 | 38.4 | 31.7 | 25.8 |
| 75 | 44.0 | 37.9 | 30.1 | 23.2 | 17.6 |
| 70 | 40.0 | 31.6 | 23.2 | 16.6 | 11.7 |
| 65 | 36.0 | 25.9 | 17.5 | 11.5 | 7.5 |
| 60 | 32.0 | 20.8 | 12.8 | 7.7 | 4.7 |
| | Number of layers each with transmission range of 40 percent | | | | |
| OST, % | 7 | 8 | 9 | 10 | 11 |
| 100 | 97.2 | 98.3 | 99.0 | 99.4 | 99.6 |
| 95 | 68.3 | 65.5 | 62.6 | 59.6 | 56.7 |
| 90 | 47.0 | 42.7 | 38.5 | 34.8 | 31.3 |
| 85 | 31.7 | 27.1 | 23.1 | 19.7 | 16.7 |
| 80 | 20.8 | 16.7 | 13.4 | 10.7 | 8.6 |
| 75 | 13.3 | 10.0 | 7.5 | 5.6 | 4.2 |
| 70 | 8.2 | 5.8 | 4.0 | 2.8 | 2.0 |
| 65 | 4.9 | 3.2 | 2.1 | 1.3 | 0.9 |
| 60 | 2.8 | 1.7 | 1.0 | 0.6 | 0.4 |
| | Number of layers each with transmission range of 40 percent | | | | |
| OST, % | 12 | 13 | 14 | 15 | — |
| 100 | 99.8 | 99.9 | 99.9 | 99.95 | |
| 95 | 54.0 | 51.3 | 48.7 | 46.3 | |
| 90 | 28.2 | 25.4 | 22.9 | 20.6 | |
| 85 | 14.2 | 12.1 | 10.3 | 8.7 | |
| 80 | 6.9 | 5.5 | 4.4 | 3.5 | |
| 75 | 3.2 | 2.4 | 1.8 | 1.3 | |
| 70 | 1.4 | 1.0 | 0.7 | 0.5 | |
| 65 | 0.6 | 0.4 | 0.2 | 0.2 | |
| 60 | 0.2 | 0.1 | 0.1 | 0.0 | |

This Table shows that, for differing open transmission values, the optimum number of layers to provide maximum transmission ranges differs, even when one assumes a single transmission range for each layer. In fact, there are three striking implications from this Table. Firstly, the Table confirms that the transmission range of light modulators can be substantially increased by stacking multiple variable transmission electro-optic layers; all values above 40 in the above Table represent cases in which the transmission range is improved by stacking. Secondly, the Table confirms that, for any given single layer open state transmission and single layer transmission range, there is an optimum number of layers for maximum transmission range of the stack. Thirdly, the Table shows that stacking is only advantageous when the single layer open state transmission exceeds a certain threshold; note that in the above Table there are no cases where stacking increases transmission range when the single layer open state transmission is 70 per cent or less. It can be shown that, for stacking of multiple layers to be advantageous, individual layers should satisfy the relationship:

$$O \geq 0.5R + 0.5$$

where O is the open state transmission of a single layer and R is the transmission range of the layer. FIG. 1 of the accompanying drawings illustrates this relationship and identifies the ranges of open state single layer transmission and single layer transmission range (the area above the sloping line) useful in the present invention.

Figure 2:
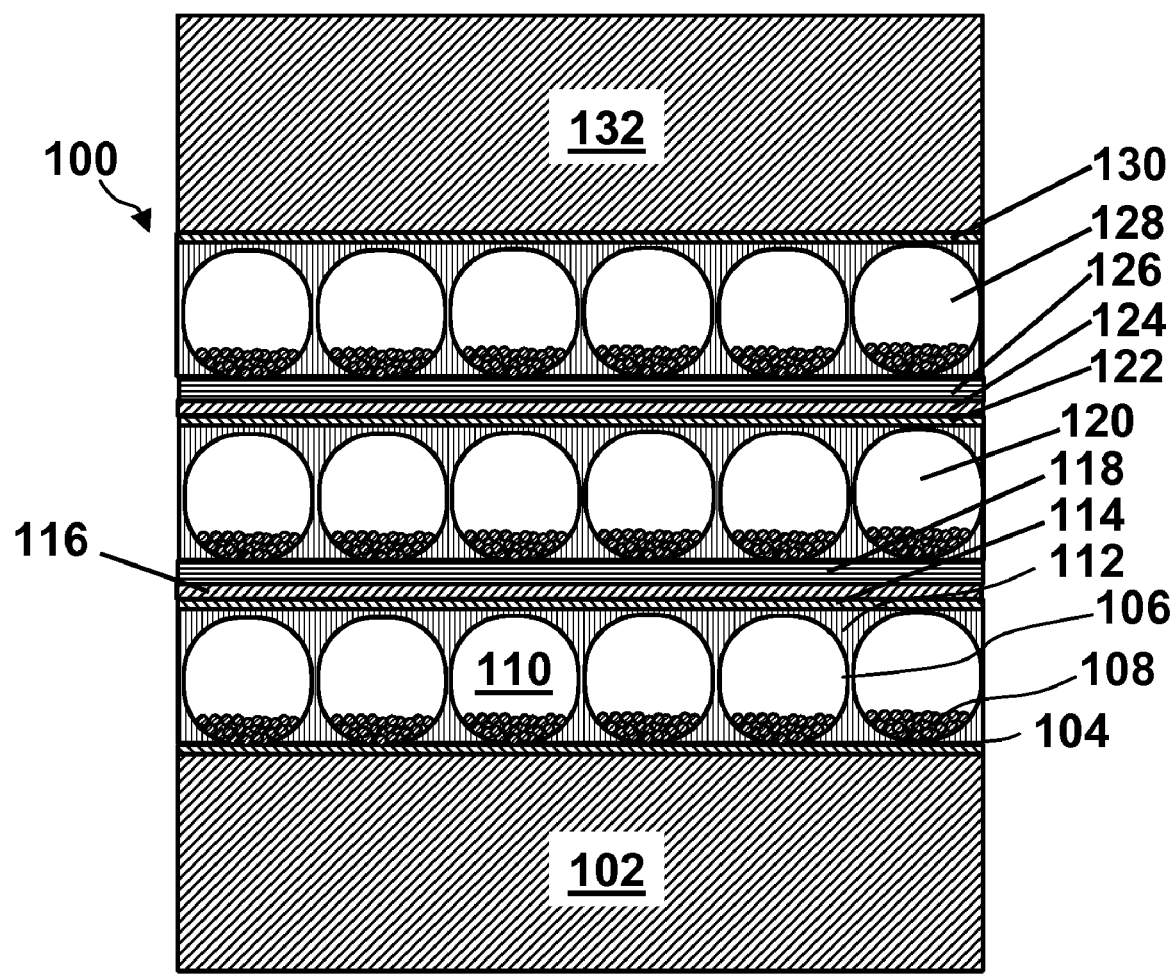
FIG. 2 is a schematic cross-section through a light modulator of the present invention.

FIG. 2 of the accompanying drawings is a highly schematic cross-section through a three electro-optic layer light modulator (generally designated 100) of the present invention. The thicknesses of the various layers in FIG. 2 are of course greatly exaggerated in relation to their lateral widths. The light modulator comprises a first transparent sheet 102, which may have the form of a glass plate, and which bears on its upper surface a transparent electrode 104, which may be in the form of a layer of indium tin oxide (ITO) sputtered directly on the sheet 102. (The light modulator 100 must of course be provided with voltage control means to control the voltages applied to the electrode 104, and to the other electrodes described below, when the optical state of the light modulator is to be changed. However, since such voltage supply means are conventional, they are omitted from FIG. 2 for ease of illustration.)

The next layer of the light modulator 100 is an electro-optic layer, in the form of an encapsulated electrophoretic layer comprising a plurality of capsules, each capsule comprising a capsule wall 106 within which are encapsulated a large number of black, electrically charged particles 108 and a fluid 110. The capsules 106 are surrounded by a polymeric binder 112 which serves to form the capsules into a mechanically coherent layer.

The light modulator 100 further comprises a second transparent electrode 114, which may be similar to the electrode 104, a polymeric support layer 116, which serves to support the thin electrode 114 and a layer of optically clear adhesive 118. There follow, in order, a second electrophoretic layer 120, a third electrode 122, a second support layer 124 and a second layer of optically clear adhesive 126, all of which can be identical to the similar layers mentioned above. Finally, the light modulator 100 comprises a third electrophoretic layer 128, a fourth electrode 130 and a second transparent sheet 132.

The four electrode layers in the light modulator 100 allow independent control of each of the three electrophoretic layers therein. It should be noted that it is not necessary to provide two electrodes associated with each electrophoretic layer; since the electrophoretic layer is sensitive only to the difference in voltage between the electrodes on either side of the electrophoretic layer, by careful control of the voltages applied to the four electrophoretic layers in the light modulator 100 it is always possible to apply the desired waveform to each electrophoretic layer. For example, if it desired to vary the optical state of the central electrophoretic layer 120 while leaving the other two electrophoretic layers unchanged, an appropriate waveform can be applied between the electrodes 114 and 122, while keeping electrode 104 at the same voltage as electrode 114 and electrode 130 at the same voltage as electrode 122.

A further benefit of stacking electro-optic layers in accordance with the present invention is that, in some cases, driving of the electro-optic layers can be simplified. In most applications, a light modulator of the present invention should desirably have a large number of gray states; for example, when a variable infra-red transmission window is used to control passive solar heating of a building, a large number of gray levels are desirable to enable the passive solar heating to be controlled accurately at varying levels of sunlight. Providing a large number of gray levels in a single electro-optic layer normally requires a rather elaborate controller, whereas much simpler controllers can be used when a single layer is driven in a "monochrome" manner (i.e., so that the layer is always either fully open or fully closed). In a stacked light modulator of the present invention, a large number of gray levels can be made available by operating the various electro-optic layers in a monochrome manner, or with only a small number of gray levels in each layer. For example, a ten-layer stack can achieve eleven different gray levels simply by switching the various electro-optic layers between their extreme open and closed states.

The light modulator of the present invention can also provide improved contrast ratio between the open and closed states of the modulator. Such an improved contrast ratio is important for practical reasons since the human eye tends to be more sensitive to contrast ratio that to absolute transmission values, and a high contrast ratio is important in creating the desired impression of a change from a "clear" window to a darkened one, even if the transmission of the clear window is in fact substantially less than 100 per cent.

In addition to providing improved contrast ratio between the open and closed states of the modulator, the modulators of the present invention can improve the granularity of the display. Granularity refers to a phenomenon whereby the optical properties of a single electro-optic layer are not absolutely constant over the entire area of the layer, particularly when the electro-optic layer is in a relatively light-transmissive state. Granularity is visible to the eye as a "mottling" of what is intended to be a uniformly transmissive or gray display or window, and is objectionable to users of light modulators. It has been found that multi-layer light modulators of the present invention tend to have less mottling that prior art single layer light modulators using similar electro-optic media.

Those skilled in the technology of light modulators will appreciate that transmission, and hence transmission range, is a function of wavelength. The light modulators of the present invention will typically be intended to control visible radiation, but we do not exclude the possibility that they might also be designed primarily to control certain non-visible wavelengths, for example ultra-violet or infra-red wavelengths. The choice of the electro-optic medium used in each layer, and of the number of layers in the present light modulators should of course be made dependent upon the transmission and transmission range of the electro-optic medium employed at the wavelength or wavelength range which the modulator is designed to control.

The light modulator of the present invention may make use of any of the types of electro-optic medium previously described. Thus, for example, the light modulator may make use of a rotating bichromal or some types of electrochromic medium. However, in general it is preferred that the present light modulator use an electrophoretic medium, preferably a microcavity electrophoretic medium, the term "microcavity" being used herein to cover encapsulated electrophoretic media, polymer-dispersed electrophoretic media and microcell electrophoretic media.

Some of the benefits of the present invention can be achieved using a single electrophoretic layer which has multiple layer of capsules or, in the case of a polymer-dispersed electrophoretic medium, multiple layers of droplets. Such a single, multi-layer film is simple to produce and lessens optical transmission losses at the interfaces inherent in a light modulator comprising separate stacked layers. However, a single, multi-layer film requires a higher operating voltage than a plurality of stacked layers which can be driven individually. Also, the single, multi-layer film does not provide the simplified "gray scale" driving available from a stacked layer device, as discussed two paragraphs above.

From the foregoing, it will be seen that the light modulator of the present invention can provide significant improvements in the transmission range and contrast ratio of an electro-optic medium, and can allow simplified driving, as compared with conventional single layer light modulators.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. A light modulator comprising a plurality of discrete variable transmission electro-optic layers arranged so that light will pass successively through the plurality of layers, wherein the individual electro-optic layers satisfy the relationship:

$$O \geq 0.5R + 0.5$$

where O is the open state transmission of a single electro-optic layer and R is the transmission range of the layer, the light modulator having a higher transmission range than any of the individual electro-optic layers separately.

2. A light modulator according to claim 1 wherein the individual electro-optic layers have an open state transmission of at least about 75 per cent.

3. A light modulator according to claim 1 further comprising two substantially transparent sheets of material disposed on opposed sides of the plurality of discrete variable transmission electro-optic layers, each of the substantially transparent sheets of material having a thickness of at least about 1 mm.

4. A light modulator comprising a plurality of discrete variable transmission electro-optic layers arranged so that light will pass successively through the plurality of layers, two electrodes disposed on opposed sides of the plurality of variable transmission electro-optic layers and arranged to apply an electric field to the electro-optic layers, and voltage supply means for controlling the voltage of the electrodes, the voltage supply means being arranged to apply a first waveform to the electrodes to drive the electro-optic layers to a first optical state in which the layers are substantially non-light-transmissive and to apply a second waveform to the electrodes to drive the electro-optic layers to a second optical state in which the layers are substantially more light-transmissive than in the first optical state, wherein the first waveform comprises a DC voltage and the second waveform comprises an alternating voltage, wherein the individual electro-optic layer satisfy the relationship: $O \geq 0.5R + 0.5$ where O is the transmission of the second optical state of a single electro-optic layer and R is the transmission of the layer.

5. A light modulator according to claim 4 wherein each of the electro-optic layers comprises an electrophoretic medium comprising a plurality of electrically charged particles disposed in a fluid and capable of moving through the fluid on application of an electric field to the medium.

6. A light modulator according to claim 5 wherein the electrophoretic medium comprises a plurality of dark colored charged particles in a liquid.

7. A light modulator according to claim 6 wherein the dark colored particles comprise carbon black or copper chromite.

8. A light modulator according to claim 5 wherein the charged particles and the fluid are confined within a plurality of cavities in a solid medium, the cavities having sidewalls extending substantially perpendicular to the thickness of the electro-optic layer.

9. A light modulator according to claim 4 having only the two electrodes disposed on opposed sides of the plurality of discrete variable transmission electro-optic layers, and not having an electrode between any of the adjacent pairs of electro-optic layers.

10. A light modulator according to claim 4 further comprising at least one electrode between each adjacent pair of electro-optic layers.

11. A light modulator according to claim 4 having at least one layer of optically clear adhesive between an adjacent pair of electro-optic layers.

12. A light modulator according to claim 4 wherein the individual electro-optic layers have a transmission in their second optical state of at least about 75 per cent.

13. A light modulator according to claim 4 having at least three electro-optic layers.

14. A light modulator according to claim 13 comprising not more than six electro-optic layers.

15. A light modulator according to claim 4 further comprising two substantially transparent sheets of material disposed on opposed sides of the plurality of discrete variable transmission electro-optic layers, each of the substantially transparent sheets of material having a thickness of at least about 1 mm.

16. A light modulator according to claim 15 wherein the substantially transparent sheets are formed of glass, so that the light modulator forms a variable transmission window.

* * * * *